United States Patent
Oehring et al.

(10) Patent No.: US 12,438,480 B2
(45) Date of Patent: Oct. 7, 2025

(54) WIRELINE POWER SUPPLY DURING ELECTRIC POWERED FRACTURING OPERATIONS

(71) Applicant: U.S. Well Services, LLC, Houston, TX (US)

(72) Inventors: Jared Oehring, Houston, TX (US); Brandon Neil Hinderliter, Houston, TX (US); Joel Broussard, Lafayette, LA (US)

(73) Assignee: U.S. WELL SERVICES, LLC, Willow Park, TX (US)

( * ) Notice: Subject to any disclaimer, the term of this patent is extended or adjusted under 35 U.S.C. 154(b) by 0 days.

(21) Appl. No.: 18/654,829

(22) Filed: May 3, 2024

(65) Prior Publication Data
US 2024/0291405 A1   Aug. 29, 2024

Related U.S. Application Data

(63) Continuation of application No. 17/968,532, filed on Oct. 18, 2022, now Pat. No. 12,009,762, which is a
(Continued)

(51) Int. Cl.
*E21B 43/26* (2006.01)
*E21B 43/267* (2006.01)
(Continued)

(52) U.S. Cl.
CPC ............. *H02P 1/30* (2013.01); *E21B 43/26* (2013.01); *E21B 43/267* (2013.01); *F01D 15/08* (2013.01);
(Continued)

(58) Field of Classification Search
None
See application file for complete search history.

(56) References Cited

U.S. PATENT DOCUMENTS

| | | |
|---|---|---|
| 1,541,601 A | 6/1925 | Tribe |
| 1,656,861 A | 1/1928 | Leonard |

(Continued)

FOREIGN PATENT DOCUMENTS

| | | |
|---|---|---|
| AU | 2007340913 | 7/2008 |
| CA | 2406801 | 11/2001 |

(Continued)

OTHER PUBLICATIONS

World's Best Swivel Joints, Flowvalve, 2013, https://web.archive.org/web/20150117041757/http://www.flowvalve.com:80/swivels, 10 pages.

(Continued)

*Primary Examiner* — Kenneth L Thompson
(74) *Attorney, Agent, or Firm* — Abel Schillinger, LLP

(57) ABSTRACT

A system and method for supplying electric power to various pieces of fracturing equipment in a fracturing operation with gas powered generators. The system and method also includes switch gears, auxiliary trailers, transformers, power distribution panels, new receptacles, and cables to supply three-phase power to electric fracturing equipment. The switchgear in the power supply system is weatherproof and able to endure the wear and tear of mobilization. The novel system and method provide clean and quiet electricity to all the equipment on site.

18 Claims, 4 Drawing Sheets

Related U.S. Application Data continuation of application No. 15/235,788, filed on Aug. 12, 2016, now Pat. No. 11,476,781, which is a continuation-in-part of application No. 15/202,085, filed on Jul. 5, 2016, now Pat. No. 10,337,308, which is a continuation of application No. 13/679,689, filed on Nov. 16, 2012, now Pat. No. 9,410,410.

(60) Provisional application No. 62/204,842, filed on Aug. 13, 2015.

(51) Int. Cl.
*F01D 15/08* (2006.01)
*F04B 35/04* (2006.01)
*F04B 49/20* (2006.01)
*H02P 1/30* (2006.01)

(52) U.S. Cl.
CPC .............. *F04B 35/04* (2013.01); *F04B 49/20* (2013.01); *E21B 43/2607* (2020.05)

(56) References Cited

U.S. PATENT DOCUMENTS

| | | |
|---|---|---|
| 1,671,436 A | 5/1928 | Melott |
| 1,743,771 A | 1/1930 | Hallundbaek |
| 1,967,466 A | 7/1934 | Damsel |
| 2,004,077 A | 6/1935 | McCartney |
| 2,183,364 A | 12/1939 | Bailey |
| 2,220,622 A | 11/1940 | Aitken |
| 2,244,106 A | 6/1941 | Granberg |
| 2,248,051 A | 7/1941 | Armstrong |
| 2,407,796 A | 9/1946 | Page |
| 2,416,848 A | 3/1947 | Rothery |
| 2,753,940 A | 7/1956 | Bonner |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,347,570 A | 10/1967 | Rosessler |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 3,967,841 A | 7/1976 | Kendrick |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,783,038 A | 11/1988 | Gilbert |
| 4,793,386 A | 12/1988 | Sloan |
| 4,845,981 A | 7/1989 | Pearson |
| 4,922,463 A | 5/1990 | Del Zotto et al. |
| 5,006,044 A | 4/1991 | Walker, Sr. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,293,947 A | 3/1994 | Stratton |
| 5,334,899 A | 8/1994 | Skybyk |
| 5,366,324 A | 11/1994 | Arlt |
| 5,422,550 A | 6/1995 | McClanahan |
| 5,439,066 A | 8/1995 | Gipson |
| 5,517,822 A | 5/1996 | Haws et al. |
| 5,548,093 A | 8/1996 | Sato |
| 5,549,285 A | 8/1996 | Collins |
| 5,590,976 A | 1/1997 | Kilheffer et al. |
| 5,606,853 A | 3/1997 | Birch |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Lozuik |
| 5,798,596 A | 8/1998 | Lordo |
| 5,865,247 A | 2/1999 | Paterson et al. |
| 5,879,137 A | 3/1999 | Yie |
| 5,894,888 A | 4/1999 | Wiemers |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,406,011 B1 | 6/2002 | Kosar |
| 6,477,852 B2 | 11/2002 | Dodo |
| 6,484,490 B1 | 11/2002 | Olsen |
| 6,491,098 B1 | 12/2002 | Dallas |
| 6,510,695 B1 | 1/2003 | Fisher |
| 6,529,135 B1 | 3/2003 | Bowers et al. |
| 6,626,646 B2 | 9/2003 | Rajewski |
| 6,756,304 B1 | 6/2004 | Robert |
| 6,765,304 B2 | 7/2004 | Baten |
| 6,776,227 B2 | 8/2004 | Beida |
| 6,788,022 B2 | 9/2004 | Sopko |
| 6,802,690 B2 | 10/2004 | Han |
| 6,808,303 B2 | 10/2004 | Fisher |
| 6,837,910 B1 | 1/2005 | Yoshikawa |
| 6,931,310 B2 | 8/2005 | Shimizu et al. |
| 6,936,947 B1 | 8/2005 | Leijon |
| 6,985,750 B1 | 1/2006 | Vicknair et al. |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,279,655 B2 | 10/2007 | Blutke |
| 7,308,933 B1 | 12/2007 | Mayfield |
| 7,309,835 B2 | 12/2007 | Morrison |
| 7,312,593 B1 | 12/2007 | Streicher et al. |
| 7,336,514 B2 | 2/2008 | Amarillas |
| 7,341,287 B2 | 3/2008 | Gibb |
| 7,388,303 B2 | 6/2008 | Seiver |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson et al. |
| 7,753,310 B2 | 7/2010 | West et al. |
| 7,755,310 B2 | 7/2010 | West et al. |
| 7,770,396 B2 | 8/2010 | Roby |
| 7,795,830 B2 | 9/2010 | Johnson |
| 7,807,048 B2 | 10/2010 | Collette |
| 7,835,140 B2 | 11/2010 | Mori |
| 7,845,413 B2 | 12/2010 | Shampine et al. |
| 7,900,893 B2 | 3/2011 | Teurlay |
| 7,926,562 B2 | 4/2011 | Poitzsch |

(56) References Cited

U.S. PATENT DOCUMENTS

| | | |
|---|---|---|
| 7,940,039 B2 | 5/2011 | de Buda |
| 7,977,824 B2 | 7/2011 | Halen et al. |
| 7,984,757 B1 | 7/2011 | Keast |
| 8,037,936 B2 | 10/2011 | Neuroth |
| 8,054,084 B2 | 11/2011 | Schulz et al. |
| 8,083,504 B2 | 12/2011 | Williams |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,221,513 B2 | 7/2012 | Ariyapadi |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| RE44,444 E | 8/2013 | Dole |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope |
| 8,763,387 B2 | 7/2014 | Schmidt |
| 8,774,972 B2 | 7/2014 | Rusnak et al. |
| 8,789,601 B2 | 7/2014 | Broussard et al. |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,870,990 B2 | 10/2014 | Marks |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,062,545 B2 | 6/2015 | Roberts et al. |
| 9,067,182 B2 | 6/2015 | Nichols |
| 9,103,193 B2 | 8/2015 | Coli |
| 9,119,326 B2 | 8/2015 | McDonnell |
| 9,121,257 B2 | 9/2015 | Coli et al. |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,322,239 B2 | 4/2016 | Angeles Boza et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,506,333 B2 | 11/2016 | Castillo et al. |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring et al. |
| 9,840,901 B2 | 12/2017 | Oehring |
| 9,863,228 B2 | 1/2018 | Shampine et al. |
| 9,893,500 B2 | 2/2018 | Oehring |
| 9,903,190 B2 | 2/2018 | Conrad |
| 9,915,128 B2 | 3/2018 | Hunter |
| 9,932,799 B2 | 4/2018 | Symchuk |
| 9,936,961 B2 | 4/2018 | Chien et al. |
| 9,970,278 B2 | 5/2018 | Broussard |
| 9,976,351 B2 | 5/2018 | Randall |
| 10,008,880 B2 | 6/2018 | Vicknair |
| 10,020,711 B2 | 7/2018 | Oehring |
| 10,119,381 B2 | 11/2018 | Oehring |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 * | 4/2019 | Payne ................ E21B 43/2607 |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring |
| 10,408,031 B2 | 9/2019 | Oehring |
| 10,415,332 B2 | 9/2019 | Morris et al. |
| 10,436,026 B2 | 10/2019 | Ounadjela |
| 10,526,882 B2 | 1/2020 | Oehring |
| 10,627,003 B2 | 4/2020 | Dale et al. |
| 10,648,311 B2 | 5/2020 | Oehring |
| 10,669,471 B2 | 6/2020 | Schmidt et al. |
| 10,690,131 B2 | 6/2020 | Rashid |
| 10,695,950 B2 | 6/2020 | Igo et al. |
| 10,711,576 B2 | 7/2020 | Bishop |
| 10,740,730 B2 | 8/2020 | Altamirano et al. |
| 10,794,165 B2 | 10/2020 | Fischer et al. |
| 10,815,978 B2 | 10/2020 | Glass |
| 10,934,824 B2 | 3/2021 | Oehring |
| 11,091,992 B2 | 8/2021 | Broussard |
| 11,109,508 B1 | 8/2021 | Yeung |
| 11,181,107 B2 | 11/2021 | Oehring |
| 11,476,781 B2 * | 10/2022 | Oehring ................ F04B 49/20 |
| 12,009,762 B2 * | 6/2024 | Oehring ................ E21B 43/26 |
| 2001/0000996 A1 | 5/2001 | Grimland et al. |
| 2002/0169523 A1 | 11/2002 | Ross |
| 2003/0056514 A1 | 3/2003 | Lohn |
| 2003/0057704 A1 | 3/2003 | Baten |
| 2003/0079875 A1 | 5/2003 | Weng |
| 2003/0138327 A1 | 7/2003 | Jones et al. |
| 2004/0040746 A1 | 3/2004 | Niedemayr |
| 2004/0102109 A1 | 5/2004 | Cratty |
| 2004/0167738 A1 | 8/2004 | Miller |
| 2005/0061548 A1 | 3/2005 | Hooper |
| 2005/0116541 A1 | 6/2005 | Seiver |
| 2005/0116542 A1 | 6/2005 | Seiver |
| 2005/0201197 A1 | 9/2005 | Duell et al. |
| 2005/0274508 A1 | 12/2005 | Folk |
| 2006/0052903 A1 | 3/2006 | Bassett |
| 2006/0109141 A1 | 5/2006 | Huang |
| 2006/0260331 A1 | 11/2006 | Andreychuk |
| 2007/0125544 A1 | 6/2007 | Robinson |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1 | 4/2008 | Mantei et al. |
| 2008/0112802 A1 | 5/2008 | Orlando |
| 2008/0137266 A1 | 6/2008 | Jensen |
| 2008/0164023 A1 | 7/2008 | Dykstra et al. |

(56) References Cited

U.S. PATENT DOCUMENTS

| | | |
|---|---|---|
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2008/0288115 A1 | 11/2008 | Rusnak |
| 2009/0045782 A1 | 2/2009 | Datta |
| 2009/0065299 A1 | 3/2009 | Vito |
| 2009/0068031 A1 | 3/2009 | Gambier |
| 2009/0068301 A1 | 3/2009 | Gambier |
| 2009/0072645 A1 | 3/2009 | Quere |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0114392 A1 | 5/2009 | Tolman |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2009/0315297 A1 | 12/2009 | Nadeau |
| 2010/0000508 A1 | 1/2010 | Chandler |
| 2010/0019574 A1 | 1/2010 | Baldassarre |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0193057 A1 | 8/2010 | Garner |
| 2010/0200224 A1 | 8/2010 | Nguete |
| 2010/0250139 A1 | 9/2010 | Hobbs et al. |
| 2010/0281876 A1 | 11/2010 | Khan |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier et al. |
| 2011/0061855 A1 | 3/2011 | Case et al. |
| 2011/0081268 A1 | 4/2011 | Ochoa et al. |
| 2011/0085924 A1 | 4/2011 | Shampine et al. |
| 2011/0110793 A1 | 5/2011 | Leugemors et al. |
| 2011/0166046 A1 | 7/2011 | Weaver |
| 2011/0175397 A1 | 7/2011 | Amrine |
| 2011/0197988 A1 | 8/2011 | Van Vliet |
| 2011/0241590 A1 | 10/2011 | Horikoshi |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0112757 A1 | 5/2012 | Vrankovic |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0078114 A1 | 3/2013 | Van Rijswick |
| 2013/0138254 A1 | 5/2013 | Seals |
| 2013/0175038 A1 | 7/2013 | Conrad |
| 2013/0175039 A1 | 7/2013 | Guidy |
| 2013/0180722 A1 | 7/2013 | Olarte Caro et al. |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284455 A1 | 10/2013 | Kajaria et al. |
| 2013/0299167 A1 | 11/2013 | Fordyce et al. |
| 2013/0306322 A1* | 11/2013 | Sanborn .............. E21B 43/2607 166/308.1 |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0077607 A1 | 3/2014 | Clarke |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0219824 A1 | 8/2014 | Burnette |
| 2014/0246211 A1 | 9/2014 | Guidy |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0294603 A1 | 10/2014 | Best |
| 2014/0379300 A1 | 12/2014 | Devine et al. |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne et al. |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |

(56) References Cited

U.S. PATENT DOCUMENTS

| | | |
|---|---|---|
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hernandez et al. |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0138171 A1 | 5/2017 | Richards et al. |
| 2017/0146189 A1 | 5/2017 | Herman |
| 2017/0159570 A1 | 6/2017 | Bickerty |
| 2017/0159654 A1 | 6/2017 | Kendrick |
| 2017/0204852 A1 | 7/2017 | Barnett |
| 2017/0212535 A1 | 7/2017 | Shelman et al. |
| 2017/0218727 A1 | 8/2017 | Oehring |
| 2017/0218843 A1 | 8/2017 | Oehring et al. |
| 2017/0222409 A1 | 8/2017 | Oehring et al. |
| 2017/0226838 A1 | 8/2017 | Ciezobka et al. |
| 2017/0226842 A1 | 8/2017 | Omont et al. |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye et al. |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1 | 2/2018 | Stegemoeller |
| 2018/0038216 A1 | 2/2018 | Zhang |
| 2018/0090914 A1 | 3/2018 | Johnson et al. |
| 2018/0181830 A1 | 6/2018 | Luharuka et al. |
| 2018/0216455 A1 | 8/2018 | Andreychuk |
| 2018/0245428 A1 | 8/2018 | Richards |
| 2018/0259080 A1 | 9/2018 | Dale et al. |
| 2018/0266217 A1 | 9/2018 | Funkhouser et al. |
| 2018/0284817 A1 | 10/2018 | Cook et al. |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang |
| 2018/0363437 A1 | 12/2018 | Coli |
| 2018/0363640 A1 | 12/2018 | Kajita et al. |
| 2019/0003329 A1 | 1/2019 | Morris |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart |
| 2019/0112910 A1 | 4/2019 | Oehring |
| 2019/0120024 A1 | 4/2019 | Oehring |
| 2019/0128080 A1 | 5/2019 | Ross |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0249527 A1 | 8/2019 | Kraynek |
| 2019/0257462 A1 | 8/2019 | Rogers |
| 2019/0292866 A1 | 9/2019 | Ross |
| 2019/0292891 A1 | 9/2019 | Kajaria |
| 2019/0316447 A1 | 10/2019 | Oehring |
| 2020/0047141 A1 | 2/2020 | Oehring et al. |
| 2020/0088152 A1 | 3/2020 | Alloin et al. |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 | 9/2004 |
| WO | 00/47893 | 8/2000 |
| WO | 2012051705 | 4/2012 |
| WO | 2014116761 | 7/2014 |
| WO | 2014177346 | 11/2014 |
| WO | 2016144939 | 9/2016 |
| WO | 2016160458 | 10/2016 |
| WO | 2018044307 A1 | 3/2018 |
| WO | 2018213925 A1 | 11/2018 |

OTHER PUBLICATIONS

Zeus Electric Pumping Unit, Halliburton, http://www.halliburton.com/en/products/zeus-electric-pumping-unit, 2021, 4 pages.

Professional Publications, Inc., FE Exam, PE Exam, ARE Exam, and NCIDQ Exam Review/ Professional Engineering Licensing, Teaching an Electrical and Computer Engineering PE Exam Review Course, https://web.archive.org/web/20031223100101/http://ppi2pass.com:80/catalog/servlel/MyPpi_pg_corner-teachee.html, accessed Jul. 19, 2021, 2 pages.

Professional Publications, Inc., FE Exam, PE Exam, ARE Exam, and NCIDQ Exam Review/ Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.

Professional Publications, Inc., FE Exam, PE Exam, ARE Exam, and NCIDQ Exam Review/ Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.

Project Registration, Moxastore, http://www.moxastore.com, Feb. 15, 2015, 2 pages.

(56) References Cited

OTHER PUBLICATIONS

Public Catalog of the U.S. Copyright Office for search result: electrical engineering reference manual, https://cocatalog.oc.gov/cgi-bin/Pwebrecon.cgi?v1=6&ti=1, 6&Search_Arg=electrical engineering reference manual&Search_Code=TALL&CNT=25&PI . . . , accessed Jul. 21, 2021, 2 pages.
Publications, U.S. Department of Labor—Occupational Safety and Health Administration, https://web.archive.org/web/20150626140537/https:/Jwww.osha.gov/pls/publications/publication.html, 47 pages.
Pulsation Dampers, Coorstek, 2014, https://web.archive.org/web/20140919005733/http://coorstek.com/markets/ energy_equip . . . , 2 pages.
R. Mistry et al., "Induction Motor Vibrations in view of the API 541—4th Edition," IEEE, accessed Jun. 10, 2021, 10 pages.
Random House Webster's Unabridged Dictionary, Second Edition, 2001, p. 990.
Ryan Davis, "Albright Says He'll Very Rarely Put Cases on Hold for PTAB," Law 360, https://www.law360.com/articles/1381597/print?section=ip, 2 pages.
Schlumberger, "Jet Manual 23, Fracturing Pump Units, SPF/SPS-343, Version 1.0," Jan. 31, 2007, 68 pages.
Society of Automotive Engineers, Sae J1292: Automobile, Truck, Truck-Tractor, Trailer, and Motor Coach Wiring, 49 CFR 393.28, Oct. 1981, 6 pages.
Stan Gibilisco, The Illustrated Dictionary of Electronics: Audio/Video Consumer Electronics Wireless Technology—Eighth Edition, 2001, p. 667.
Standing Order Governing Proceedings—Patent Cases, in the United States District Court for the Western District of Wexas, Waco Division, filed Nov. 17, 2021, 11 pages.
Stephen Cary et al., "Electric Rotating Machine Standards Part II: Magnetic Wedge Design & Monitoring Methods," 2011 IEEE, Paper No. PCIC-2011-41, 8 pages.
Steven C. Carlson, Weaponizing IPRs, Landslide, Sep. 22, 2019, 10 pages.
Stewart & Stevenson, "Stimulation Systems," 2007, 20 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
T. W. Paschall et al., "Navigating the Test Requirements of API 541 4th Edition," 2007, IEEE, Paper No. PCIC-2007-11, 12 pages.
Testimony of Judge Paul R. Michel (Rel.) United States Court of Appeals for the Federal Circuit Before the Subcommittee on Intellectual Property, U.S. Senate Committee on the Judiciary, Jun. 4, 2019, 8 pages.
The American Heritage Dictionary of the English Language, Fifth Edition, Fiftieth Anniversary, p. 911.
Thorndike Saville, The Victaulic Pipe Joint, Journal of American Water Works Association, Nov. 1922, vol. 9, No. 6, pp. 921-927.
Tim Rahill and Michael C. Fousha, "Sorting Out the Overlap," Jan./Feb. 2009, IEEE Industry Applications Magazine, 12 pages.
*Transcend Shipping Systems LLC v Mediterranean Shipping Company SA*, Case No. 6:21-cv-00040, Document 27, Prder of Dismissal with Prejudice, Dec. 7, 2021, 1 page.
Transcend Shipping Systems, LLC and Hapag-Lloyd AG and Hapag-Lloyd (America) LLC, CMA CGM (America) LLC and CMA CGM SA, Mediterranean Shipping Company SA, Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.

U.S. Well Services Investor and Analyst Update: Second Quarter 2021 in Review, 2021, 7 pages.
*U.S. Well Services, Inc. and U.S. Well Services, LLC v Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
*U.S. Well Services, Inc. and U.S. Well Services, LLC v Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC v Halliburton Company and Cimarex Energy Co.*, Case No. 6:21-cv-00367-ADA, Document 56, Defendants' Opening Claim Construction Brief, Oct. 27, 2021, 46 pages.
*U.S. Well Services, Inc. and U.S. Well Services, LLC v Halliburton Company and Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc. and U.S. Well Services, LLC v Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC v Halliburton Company and Cimarex Energy Co.*, Case No. 6:21-cv-00367-ADA, Plaintiffs Disclosure of Asserted Claims and Preliminary Infringement Contentions, Jul. 12, 2021, 9 pages.
*U.S. Well Services, Inc. v Halliburton Company*, Case No. 6:21-cv-00367-ADA, Civil Docket, accessed Dec. 13, 2021, 14 pages.
*U.S. Well Services, Inc. v Halliburton Company*, Case No. 6:21-cv-00367-ADA, Civil Docket, accessed Dec. 17, 2021, 14 pages.
*U.S. Well Services, Inc. v Halliburton Company*, Case No. 6:21-cv-00367-ADA, Document 64, Order Resetting Markman Hearing, Dec. 8, 2021, 1 page.
*U.S. Well Services, Inc. v Halliburton Company*, Civil Docket for Case# 6:21-cv-00367-ADA, https://ecf.txwd.uscourts.gov/cgi-bin/DktRpt.pl?190912742001885-L_1_0-1, Accessed Nov. 29, 2021, 13 pages.
*U.S. Well Services, Inc., and U.S. Well Services, LLC v Halliburton Company, Cimarex Energy Co., Halliburton Energy Services, Inc., and Halliburton US Techologies, Inc.*, Case No. WA:21-CV-00367-ADA, Document 61, Order Setting Markman Hearing, Nov. 29, 2021, 1 page.
*U.S. Well Services, LLC v Tops Well Services, LLC and Honghua America, LLC*, Case No. 3:19-cv-00237, Document 1, Plaintiff's Original Complaint, 63 pages.
*U.S. Well Services, LLC v Tops Well Services, LLC and Honghua America, LLC*, Case No. 3:19-cv-00237, Document 72, Plaintiff's Opening Claim Construction Brief, Apr. 24, 2020, 37 pages.
*U.S. Well Services, LLC v Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC v Tops Well Services, LLC and Honghua America, LLC*, Case No. 3:19-cv-00237, Document 90, Plaintiff's Opposition to Defendants' Motion for Summary Judgment of Invalidity under 35 USC 112, 30 pages.
*U.S. Well Services, LLC v Tops Well Services, LLC*, Case No. 3:19-cv-237, Document 135, Order, September 22, 2021, 2 pages.
UK Power Networks—Transformers to Supply Heat to Tate Modern—from Press Releases May 16, 2013.
US. Well Services, Inc. files suit against Halliburton Company and Cimarex Energy Co. for patent infringement, Apr. 15, 2021, PR Newswire, https://www.prnewswire.com/news-releases/us-well-services-inc-files-suit-against-halliburton-company-and-cimarex-energy-co-for-patent-infringement-301270118.html, 2 pages.
Victaulic Couplings Vibration Attenuation Characteristics, Victaulic, Publication 26.04, Oct. 2014, 5 pages.
Wire Rope Isolator Technologies, Enidine, Dec. 2011, 78 pages.
Woodbury et al., "Electrical Design Considerations for Drilling Rigs," IEEE Transactions on Industry Applications, vol. 1A-12, No. 4, July/Aug. 1976, pp. 421-431.
"Clean Fleet Reduces Emissions by 99% at Hydraulic Fracturing Sites," Fluid Power Journal, https://fluidpowerjoumal.com/clean-fleet-reduces-emissions/, accessed Sep. 22, 2021, 5 pages.

(56) References Cited

OTHER PUBLICATIONS

"Game-changing hydraulic fracturing technology, reduces emissions by 99%," Intrado Globe News Wire, Oct. 1, 2014, https://www.globenewswire.com/fr/news-release-2014/10/01/670029/10100696/en/Game-changing-hydraulic-fracturing-technology-reduces-emissions-by-99.html, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
"Griswold Model 811 Pumps: Installation, Operation and Maintenance Manual, ANSI Process Pump," 2010, 60 pages.
"Halliburton Delivers Successful Grid-Powered Frac Operation," https://www.halliburton.com/en/about-/press-release/halliburton-delivers-first-successful-grid-powered-fracturing-operation, accessed Sep. 27, 2021, 4 pages.
"Heat Exchanger" {htlps://en.wikipedia.org/w/index.php?tille=Heat_exchanger&oldid=89300146) Dec. 18, 2019 Apr. 2019 (Apr. 18, 2019), entire document, especially para (0001].
"Kerr Pumps & FlowVale Awards for Excellence in Well Completion, Northeast 2017—Awarded to: U.S. Well Services,' https://www.oilandgasawards.com/winner/northeast-2017-kerr-pumps-flowvale-awards . . . ", accessed Oct. 5, 2021, 4 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
"Process Burner" {https://www.cebasrt.com/productsloii-gaslprocess-bumer) 06 Sep. 6, 2018 {Sep. 6, 2018), entire document, especially para {Burners for refinery Heaters].
"SainSmart TCP/IP Ethernet to Serial RS232 RS485 Intelligent Communication Converter," SainSmart, http://www.amazon.com/SainSmart-Ethemet-Intelligent-Communication-Converter/dp/B008BGLUHW, Aug. 17, 2014, 4 pages.
"Screenshot of USWS Clean Fleet System Video," 1 page.
"Services—U.S. Well Services," http:f/uswellservices.com/services/, accessed Nov. 13, 2021, 10 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.
"StarTech.com 1 Port RS232 Serial to IP Ethernet Converter {NETRS2321P)," StarTech, http://www.amazon.com/ S, tarTech-com-Serial-Ethernet-Converter-NETRS2321P/dp/B0OFJEHNSO, Oct. 9, 2014, 4 pages.
"TCP/IP Ethernet to Serial RS232 RS485 RS422 Converter," Ate, http://www.amazon.com/Ethemet-Serial-RS232-RS485-Converter/dp/B00ATV2DX2, Feb. 1, 2014, 2 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
"VZ Environmental Award of Excellence in Environmental Stewardship, Rocky Mountain 2016-Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
Water and Glycol Heating Systems. {htlps://www.heat-inc.com/wg-series-water-glycol-systems/) Jun. 18, 2018 (Jun. 18, 2018), entire document, especially WG Series Water Glycol Systems.
49 C.F.R Part 393 {Oct. 1, 2006), 36 pages.
A. Abbott, Crippling the Innovation Economy: Regulatory Overreach at the Patent Office, Regulatory Transparency Project, Aug. 14, 2017, 35 pages.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
A. T. Dufresne, "How reliable are trial dates relied on by the PTAB in the Fintiv analysis?" Perkins Coie, 2021, 3 pages.
About US, Moxastore, http://www.moxastore.com/aboutus.asp, Mar. 8, 2015, 1 page.
Accommodating Seismic Movement, Victaulic Company, 2015, https://web.archive.org/web/20150412042941/http://www.victaulic.com:80/en/businesses-solutions/solutions/accommoda . . . , 2 pages.
Affidavit of Duncan Hall, Internet Archives on Jun. 7, 2021, https://web.archive.org/web/20120917102614/http:/www.quincieoilfield.com/pdf/3.0%20Gardner"/o20Denver/2500/GD2500Q%200p%20&%20Service%20Manual.pdf, 76 pages.
AGS Large Diameter Solutions, Victaulic Company, 2015, https://web.archive.org/web/20150419063052/http://fwww.victaulic.com:80/en/businesses-solutions/solutions/advanced-gr . 2 pages.
Albone, "Mobile Compressor Stations for Natural Gas Transmission Service," ASME 67-GT-33, Turbo Expo, Power for Land, Sea and Air, vol. 79887, p. 1-10, 1967.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
America Invents Act, H.R. Rep. No. 112-98, Jun. 1, 2011, 165 pages.
American Petroleum Institute, "Form-wound Squirrel-Cage Induction Motors—500 Horsepower and Larger," Jun. 2004, Fourth Edition, ANSI/API Standard 541-2003, 88 pages.
Approved American National Standard, ANSI/NEMA MG Jan. 2011, American National Standard Motors and Generators, Dec. 9, 2021, 636 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
Austin H. Bonnett, "Root Cause Failure Analysis for AC Induction Motors in the Petroleum and Chemical Industry," 2010, IEEE, Paper No. PCIC-2010-43, 13 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Bill Lockley and Barry Wood, "What do the API Motor/Generator Features Cost and What Do They Buy You?" 2010 IEEE, Paper No. PCIC-2010-22, 10 pages.
Canadian Office Action dated Apr. 18, 2018 in related Canadian Patent Application No. 2,928,711.
Canadian Office Action dated Mar. 2, 2018 in related Canadian Patent Application No. 2,833,711.
Canadian Office Action dated Sep. 28, 2018 in related Canadian Patent Application No. 2,945,281.
Canadian Office Action issued Aug. 31, 2020 in Canadian Patent Application No. 2,944,980.
Canadian Office Action issued Sep. 22, 2020 in Canadian Application No. 2,982,974.
Canadian Office Action issued Sep. 8, 2020 in Canadian Patent Application No. 2,928,707.
Canadian Office Action mailed Jun. 20, 2019 in corresponding CA Application No. 2,964,597.
Canadian Office Action mailed Jun. 22, 2018 in related Canadian Patent Application No. 2,886,697.
Canadian Office Action mailed May 30, 2019 in corresponding CA Application No. 2,833,711.
Canadian Office Action mailed Oct. 1, 2019 in related Canadian Patent Application No. 2,936,997.
Carolyn Davis, "Natural Gas Finding Niche in E-Fracking, But Diesel Still Rules," Sep. 6, 2019, Natural Gas Intel, https://www.naturalgasintel.com/natural-gas-finding-niche-in-e-fracking-but-diesel-still-rules, 9 pages.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
Chiksan Original Swivel Joints, FMC, 1997, 16 pages.
Collins English Dictionary, Twelfth Edition, 2014, p. 1005.
U.S. Appl. No. 62/323,168, 41 pages.

(56) References Cited

OTHER PUBLICATIONS

U.S. Appl. No. 62/323,303, 62 pages.
U.S. Pat. No. 10,020,711, 250 pages.
U.S. Pat. No. 10,254,732, 552 pages.
U.S. Pat. No. 10,280,724, 668 pages.
U.S. Pat. No. 10,337,308, 861 pages.
U.S. Pat. No. 10,408,030, 401 pages.
U.S. Pat. No. 10,408,031, 734 pages.
U.S. Pat. No. 10,526,882, 845 pages.
U.S. Pat. No. 8,789,601, 159 pages.
U.S. Pat. No. 9,410,410, Excerpt—Response to Non-Final Office Action filed Feb. 3, 2016, 57 pages.
U.S. Pat. No. 9,410,410,263 pages.
U.S. Pat. No. 9,745,840, 215 pages.
U.S. Pat. No. 9,840,901, 216 pages.
U.S. Pat. No. 9,893,500, 291 pages.
U.S. Pat. No. 9,970,278, 310 pages.
Final Office Action issued in corresponding U.S. Appl. No. 15/145,491 dated Jan. 20, 2017.
Final Office Action issued in corresponding U.S. Appl. No. 15/145,491 dated Sep. 6, 2017.
Final Office Action issued in corresponding U.S. Appl. No. 15/294,349 dated Jul. 6, 2017.
Final Office Action mailed Feb. 4, 2021 in U.S. Appl. No. 16/597,014.
Final Office Action mailed Jan. 11, 2021 in U.S. Appl. No. 16/404,283.
Final Office Action mailed Jan. 21, 2021 in U.S. Appl. No. 16/458,696.
Final office Action mailed Mar. 31, 2020 in U.S. Appl. No. 15/356,436.
Gardner Denver, 3" 1502 Male Hammer Union Discharge Flange, 2005, 13 pages.
Gardner Denver, Well Servicing Pump Model GD-2500Q Quintuplex—Operating and Service Manual, Aug. 2005, 46 pages.
Gardner Denver, Well Servicing Pump Model GD-2500Q, GD-2500Q-HD, Quintuplex Pumps, Sep. 2011, 45 pages.
Goodwin, "High-voltage auxiliary switchgear for power stations," Power Engineering Journal, 1989, 10 pg. (Year 1989).
Hart Energy, Hydraulic Fracturing Techbook, 2015, 99 pages.
Henry Chajet, "OSHA Issues Alert on Non-Silica Fracking Hazards," Jan. 30, 2015, National Law Review Newsroom, 2 pages.
IEEE 100 The Authoritative Dictionary of IEEE Standards Terms Seventh Edition, 2000, 7 pages.
IEEE Power Engineering Society, 112 IEEE Standard Test Procedure for Polyphase Induction Motors and Generators, eoo4, 87 pages.
Industrial Safety & Hygiene News, OSHA issues hazard alert for tracking and drilling, Jan. 6, 2015, 1 page.
Industry/Hazard Alerts, United States Department of Labor, https://web.archive.org/web/20120801064838/http://www.osha.gov:80/hazardindex.html, accessed Jun. 13, 2021, 1 page.
International Search Report and Written Opinion dated Sep. 19, 2018 in related PCT Patent Application No. PCT/US2018/040683.
International Search Report and Written Opinion issued in PCT/US2020/023809 mailed Jun. 2, 2020.
International Search Report and Written Opinion mailed Apr. 10, 2019 in corresponding PCT Application No. PCT/US2019/016635.
International Search Report and Written Opinion Mailed Aug. 28, 2020 in PCT/US20/23821.
International Search Report and Written Opinion mailed Dec. 14, 2020 in PCT/US2020/53980.
International Search Report and Written Opinion mailed Dec. 31, 2018 in related PCT Patent Application No. PCT/US18/55913.
International Search Report and Written Opinion mailed Feb. 11, 2020 in related PCT Application No. PCT/US2019/055323.
International Search Report and Written Opinion mailed Feb. 15, 2019 in related PCT Application No. PCT/US18/63977.
International Search Report and Written Opinion mailed Feb. 2, 2021 in PCT/US20/58906.
International Search Report and Written Opinion mailed Feb. 3, 2021 in PCT/US20/58899.
International Search Report and Written Opinion mailed Feb. 4, 2021 in PCT/US20/59834.
International Search Report and Written Opinion mailed in PCT/US20/67146 mailed Mar. 29, 2021.
International Search Report and Written Opinion mailed in PCT/US20/67523 mailed Mar. 22, 2021.
International Search Report and Written Opinion mailed in PCT/US20/67526 mailed May 6, 2021.
International Search Report and Written Opinion mailed in PCT/US20/67528 mailed Mar. 19, 2021.
International Search Report and Written Opinion mailed in PCT/US20/67608 mailed Mar. 30, 2021.
Comprehensive Power: Power it Up, Brochure, 26 pages.
Comprehensive Power: Power it Up, Feb. 27, 2013, 28 pages.
CoorsTek Flowguard Products, 2012, 8 pages.
D. Bogh et al., "A User's Guide to Factory Testing of Large Motors: What Should Your Witness Expect," IEEE, accessed Jun. 10, 2021, 8 pages.
D. Heidel, Safety and Health Management Aspects for Handling Silica-based Products and Engineered Nanoparticles in Sequences of Shale Reservoir Stimulations Operations, Society of Petroleum Engineers, 2004, 4 pages.
D. Nedelcut et al., "On-line and Off-line Monitoring-Diagnosis System {MOS) for Power Transformers," IEEE, 2008 International Conference on Condition Monitoring and Diagnosis, Beijing, China, Apr. 21-24, 2008, 7 pages.
Dani Kass, "Fintiv Fails: PTAB Uses 'Remarkably Inaccurate' Trial Dates," Nov. 2, 2021, Law 360, 1 page.
Declaration of Dr. L. Brun Hilbert, Jr., P.E., IPR2021-01538, Sep. 22, 2021, 99 pages.
Declaration of Dr. L. Brun Hilbert, P.E., IPR2021-01037 and IPR2021-01038, Jun. 21, 2021, 124 pages.
Declaration of Dr. Mark Ehsani, IPR2021-01035, Jun. 18, 2021, 188 pages.
Declaration of Dr. Mark Ehsani, IPR2021-01066, Jul. 2, 2021, 213 pages.
Declaration of Dr. Robert Durham, Case Nos. IPR2021-01033, IPR2021-01032 and IPR2021-01034, Jun. 18, 2021, 179 pages.
Declaration of Dr. Robert Durham, IPR2021-01065, Jun. 18, 2021, 138 pages.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YB0NOS, 43 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Joel N. Broussard, Case Nos. IPR2021-01032 & IPR2021-01033, Oct. 13, 2021, 9 pages.
Declaration of Joel N. Broussard, IPR2021-01034, IPR2021-01035, IPR2021-01036, and IPR2021-01037, Oct. 20, 2021, 11 pages.
Declaration of Joel N. Broussard, IPR2021-01038, Oct. 20, 2021, 11 pages.
Declaration of Joel N. Broussard, IPR2021-01065, Oct. 20, 2021, 11 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Declaration of Robert Durham, IPR2021-01315, Aug. 12, 2021, 209 pages.
Declaration of Robert Durham, IPR2021-01316, Aug. 13, 2021, 75 pages.
Declaration of Robert Durham, IPR2022-00074, Nov. 8, 2021, 177 pages.
Declaration of Robert Schaaf, Case Nos. IPR2021-01032 and IPR2021-01033, Oct. 12, 2021, 45 pages.
Declaration of Robert Schaaf, IPR2021-01034, Oct. 20, 2021, 47 pages.
Declaration of Robert Schaaf, IPR2021-01035, Oct. 20, 2021, 51 pages.
Declaration of Robert Schaaf, IPR2021-01037, Oct. 20, 2021, 52 pages.
Declaration of Robert Schaaf, IPR2021-01038, Nov. 10, 2021, 40 pages.

(56) References Cited

OTHER PUBLICATIONS

Declaration of Robert Schaaf, IPR2021-01065, Nov. 10, 2021, 33 pages.
Declaration of Robert Schaaf, IPR2021-01066, Nov. 17, 2021, 43 pages.
Declaration of Robert Schaaf, IPR2021-01238, Nov. 17, 2021, 38 pages.
Declaration of Robert Schaaf, IPR2021-01315, Nov. 19, 2021, 39 pages.
Declaration of Robert Schaaf, IPR2021-01316, Nov. 19, 2021, 33 pages.
Declaration of Robert Schaaf, IPR2021-01538, Dec. 28, 2021, 40 pages.
Declaration of Robert Schaaf, IPR2021-01539, Jan. 25, 2022, 37 pages.
Declaration of Robert Schaaf, IPR2022-00074, Feb. 17, 2022, 36 pages.
Declaration of Sylvia D. Hall-Ellis, IPR2022-00610, Feb. 28, 2022, 98 pages.
Declaration of Sylvia D. Hall-Ellis, Ph.D., Case Nos. IPR2021-01032, IPR2021-01033, and IPR2021-01034, Jun. 18, 2021, 173 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
Donald G. Fink, "Standard Handbook for Electrical Engineers—Thirteenth Edition," 1993, McGraw-Hill Inc., pp. 10-13, 10-21, 20-22, 20-85, 20-20, 20-89, 20-90, 20-91, 22-12, 22-13, 22-14, 22-15 and 22-16.
Elsevier, "Variable Speed Pumping—A Guide to Successful Applications," 2019, 186 pages.
Email from Michael See on Jun. 10, 2021 regarding API-541 Fourth Edition: Public Availability, 2 pages.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.
Eugene A. Avallone, Marks' Standard Handbook for Mechanical Engineers: 11th Edition, 2007, p. 16-4 and 16-22.
U.S. Pat. No. 10, 119,381, 24 pages.
U.S. Pat. No. 10,934,824, 24 pages.
U.S. Pat. U.S. Appl. No. 62/180,289, 32 pages.
U.S. Pat. U.S. Appl. No. 62/204,331, 22 pages.
U.S. Appl. No. 62/242,173, 17 pages.
U.S. Appl. No. 62/242,566, 34 pages.
Non-Final Office Action issued in U.S. Appl. No. 14/881,535 mailed May 20, 2020.
Non-Final Office Action issued in U.S. Appl. No. 15/145,443 mailed May 8, 2020.
Non-Final Office Action issued in U.S. Appl. No. 16/458,696 mailed May 22, 2020.
Non-Final Office Action issued Nov. 13, 2017 in related U.S. Appl. No. 15/644,487.
Non-Final Office Action issued Nov. 29, 2017 in related U.S. Appl. No. 15/145,414.
Non-Final Office Action issued Oct. 6, 2017 in related U.S. Appl. No. 14/881,535.
Non-Final Office Action Mailed Aug. 31, 2020 in U.S. Appl. No. 16/167,083.
Non-Final Office Action mailed Dec. 23, 2019 in related U.S. Appl. No. 16/597,008.
Non-Final Office Action mailed Dec. 6, 2019 in related U.S. Appl. No. 16/564,186.
Non-Final Office Action mailed Feb. 12, 2019 in related U.S. Appl. No. 16/170,695.
Non-Final Office Action mailed Feb. 25, 2019 in related U.S. Appl. No. 16/210,749.
Non-Final Office Action mailed Jan. 10, 2020 in related U.S. Appl. No. 16/597,014.
Non-Final Office Action mailed Jan. 29, 2021 in U.S. Appl. No. 16/564,185.
Non-Final Office Action mailed Jan. 4, 2021 in U.S. Appl. No. 16/522,043.
Non-Final Office Action mailed Mar. 6, 2019 in related U.S. Appl. No. 15/183,387.
Non-Final Office Action Mailed Sep. 2, 2020 in U.S. Appl. No. 16/356,263.
Non-Final Office Action Mailed Sep. 29, 2020 in U.S. Appl. No. 16/943,727.
Non-Final Office Mailed Oct. 26, 2020 in U.S. Appl. No. 15/356,436.
Non-Final Office Mailed Oct. 5, 2020 in U.S. Appl. No. 16/443,273.
Notice of Allowance and Notice of Allowability issued in U.S. Appl. No. 15/829,419 mailed Jul. 26, 2021.
Notice of Allowance issued in corresponding U.S. Appl. No. 14/622,532 dated Mar. 27, 2017.
Notice of Allowance issued in corresponding U.S. Appl. No. 15/217,040 dated Mar. 28, 2017.
Notice of Allowance mailed Apr. 23, 2019 in corresponding U.S. Appl. No. 15/635,028.
Notice of Allowance mailed Jan. 9, 2020 in related U.S. Appl. No. 16/570,331.
Nportia5250, Moxastore, http://www.moxastore.com/NPORTIA5250_p/nportia5250.htm.
Occupational Safety and Health Administration—Home, United States Department of Labor, https://web.archive.org/Web/20120722160756/http://www.osha.gov/, accessed Jun. 13, 2021, 2 pages.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Office Action mailed Aug. 19, 2019 in related U.S. Appl. No. 15/356,436.
Office Action mailed Dec. 12, 2018 in related U.S. Appl. No. 16/160,708.
Office Action mailed Jan. 30, 2019 in related Canadian Patent Application No. 2,936,997.
Office Action mailed Jul. 25, 2018 in related U.S. Appl. No. 15/644,487.
Office Action mailed Jun. 11, 2019 in corresponding U.S. Appl. No. 16/210,749.
Office Action mailed Jun. 7, 2019 in corresponding U.S. Appl. No. 16/170,695.
Office Action mailed Mar. 1, 2019 in related Canadian Patent Application No. 2,943,275.
Office Action mailed May 10, 2019 in corresponding U.S. Appl. No. 16/268,030.
Office Action mailed Oct. 11, 2019 in related U.S. Appl. No. 16/385,070.
Office Action mailed Oct. 2, 2019 in related U.S. Appl. No. 16/152,732.
Office Action mailed Sep. 11, 2019 in related U.S. Appl. No. 16/268,030.
Office Action mailed Sep. 20, 2019 in related U.S. Appl. No. 16/443,273.
Office Action mailed Sep. 3, 2019 in related U.S. Appl. No. 15/994,772.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
Portfolio Media Inc., A Shift to Sand: Spotlight on Silica Use in Fracking, Law360, https://www.law360.com/articles/366057/print?section=energy, accessed Jun. 10, 2021, 5 pages.
Professional Publications, Inc., Books for the FE, PE, FLS and PLS Exams, Spring 2004, http://www.ppi2pass.com/corner/catalog.pdf, 16 pages.
Professional Publications, Inc., Electrical Engineering Reference Manual, 12 pages.
Professional Publications, Inc., FE Exam, PE Exam, ARE Exam, and NCIDQ Exam Review/ Professional Engineering Licensing,

(56) References Cited

OTHER PUBLICATIONS

About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review/ Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review/ Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review/ Professional Engineering Licensing, Instructor's Corner, https://web.archive.org/web/20031219232547/http://ppi2pass.com:80/catalog/servlet/MyPpi_pg_comer-corner.html, accessed Jul. 19, 2021, 2 pages.
International Search Report and Written Opinion mailed in PCT/US2020/066543 mailed May 11, 2021.
International Search Report and Written Opinion mailed Jan. 2, 2019 in related PCT Patent Application No. PCT/US18/54542.
International Search Report and Written Opinion mailed Jan. 2, 2019 in related PCT Patent Application No. PCT/US18/54548.
International Search Report and Written Opinion mailed Jan. 2, 2020 in related PCT Application No. PCT/US19/55325.
International Search Report and Written Opinion mailed Jan. 4, 2019 in related PCT Patent Application No. PCT/US18/57539.
International Search Report and Written Opinion mailed Jul. 9, 2019 in corresponding PCT Application No. PCT/US2019/027584.
International Search Report and Written Opinion mailed Mar. 5, 2019 in related PCT Application No. PCT/US18/63970.
International Search Report and Written Opinion mailed Nov. 26, 2019 in related PCT Application No. PCT/US19/51018.
International Search Report and Written Opinion mailed Sep. 11, 2019 in related PCT Application No. PCT/US2019/037493.
International Search Report and Written Opinion Mailed Sep. 3, 2020 in PCT/US2020/36932.
J. C. Wachel et al., "Analysis of Vibration and Failure Problems in Reciprocating Triplex Pumps for Oil Pipelines," The American Society of Mechanical Engineers, Presented at the Energy—Sources and Technology Conference and Exhibition, Dallas, Texas, Feb. 17-21, 1985, 8 pages.
J. Malinowski et al., "Petrochemical Standards A Comparison Between IEEE 841-2001, API 541, and API 547," 2004, IEEE, Paper No. PCIC-2004-22, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
Jodi Shafto, "Growth in electric-tracking fleets stunted by tight producer budgets," Aug. 6, 2019, S&P Global Market Intelligence, https://www.spglobal.com/marketintelligence/en/news-insights/latest-news-headlines/growth-in-electric-fracking-fleets-stunted-by-tight-producer-budgets, accessed Sep. 16, 2021, 4 pages.
John A. Camara, PE, Electrical Engineering Reference Manual for the Electrical and Computer PE Exam, Sixth Edition, 2002, 102 pages.
John Daniel, "8.30 DEP Industry Observations: New Flac Fleet; New Fleet Designs Forthcoming," Daniel Energy Partners, Aug. 30, 2020, 13 pages.
Karim, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Katsuhiko Ogata, Modern Control Engineering: Third Edition, 1997, 2 pages.

*Kirsch Research and Development, LLC v Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC v Signfiy North America Corp., Signify Holding B.V., and Signify N.V.*, Case No. 6:20-cv-01056-ADA, Document 24, Scheduling Order, Aug. 13, 2021, 4 pages.
*LedComm LLC v Signify North America Corporation*, Case No. 6:20-cv-01056-ADA, Civil Docket, accessed Dec. 8, 2021, 11 pages.
Lionel B. Roe, Practices and Procedures of Industrial Electrical Design, 1972, McGraw-Hill, Inc., Chapter 2: The Basic Electric System, 11 pages.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
Luis Gamboa, "Variable Frequency Drives in Oil and Gas Pumping Systems," Dec. 17, 2011, 5 pages.
M. E. Rahman et al., "Wire rope isolators for vibration isolation of equipment and structures—A review," IOP Conference Series Materials Science and Engineering, Apr. 2015, 12 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
Maxwell James Clerk 1868, On Governors, Proc. R Soc. Land., pp. 16270-283.
Michael Quentin Morton, Unlocking the Earth: A Short History of Hydraulic Fracturing (2013), GeoExpro, vol. 10, No. 6, 5 pages.
Mike Soraghan, OSHA issues hazard alert for tracking and drilling, E&E, Dec. 10, 2014, 1 page.
Mohinder L. Nayyar, Piping Handbook Seventh Edition, McGraw-Hill Handbook, 2000, 77 pages.
Morris et al., U.S. Appl. No. 62/526,869; Hydration-Blender Transport and Electric Power Distribution for Fracturing Operation; Jun. 28, 2018; USPTO; see entire document.
Moxa 802.11 Ethernet to Serial, Moxastore, http://www.moxastore.com/Moxa_802_11_Wi_Fi_Ethemet_to_Serial_s/587.html, May 24, 2016, 1 page.
National Electrical Manufacturers Association, NEMA ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Non Final Office Action mailed Mar. 3, 2020 in U.S. Appl. No. 16/152,695.
Non-Final Office Action dated Oct. 4, 2018 in related U.S. Appl. No. 15/217,081.
Non-Final Office Action issued in corresponding U.S. Appl. No. 14/884,363 dated Sep. 5, 2017.
Non-Final Office Action issued in corresponding U.S. Appl. No. 15/145,443 dated Feb. 7, 2017.
Non-Final Office Action issued in Corresponding U.S. Appl. No. 15/145,491 on May 15, 2017.
Non-Final Office Action issued in corresponding U.S. Appl. No. 15/291,842 dated Jan. 6, 2017.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Non-Final Office Action issued in U.S. Appl. No. 14/881,535 mailed Jul. 21, 2021.

(56) References Cited

OTHER PUBLICATIONS

Non-Final Office Action issued in U.S. Appl. No. 16/404,283 mailed Jul. 21 2021.
Non-Final Office Action issued in U.S. Appl. No. 16/871,928 mailed Aug. 25, 2021.
Non-Final Office Action issued in U.S. Appl. No. 16/943,727 mailed Aug. 3, 2021.

* cited by examiner

WIRELINE POWER SUPPLY DURING ELECTRIC POWERED FRACTURING OPERATIONS

CROSS-REFERENCE TO RELATED APPLICATIONS

This application is a continuation of U.S. patent application Ser. No. 17/968,532 filed on Oct. 18, 2022, which is a continuation of U.S. patent application Ser. No. 15/235,788 filed on Aug. 12, 2016, now U.S. Pat. No. 11,476,781 issued Oct. 18, 2022, which claims priority to U.S. Provisional Patent Application No. 62/204,842 filed on Aug. 13, 2015 and is a continuation-in-part of and claims priority to and the benefit of U.S. patent application Ser. No. 15/202,085 filed Jul. 5, 2016, now U.S. Pat. No. 10,337,308 issued Jul. 2, 2019, which is a continuation and claims priority to and the benefit of U.S. patent application Ser. No. 13/679,689 filed Nov. 16, 2012, now U.S. Pat. No. 9,410,410 issued Aug. 9, 2016, the full disclosures of which are hereby incorporated by reference herein for all purposes.

BACKGROUND OF THE INVENTION

1. Technical Field

This invention relates generally to hydraulic fracturing and more particularly to systems and methods for supplying electric power to all components in a hydraulic fracturing operation.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracking) operations typically require powering numerous components in order to recover oil and gas resources from the ground. For example, hydraulic fracturing usually includes pumps that inject fracking fluid down the wellbore, blenders that mix proppant into the fluid, cranes, wireline units, and many other components that all must perform different functions to carry out fracking operations.

Pumping the fracturing fluid into the well at high pressure creates fractures in a subterranean formation so that hydrocarbons have new channels through which to flow into the well. One fracking method is commonly called plug and perf. Perforating refers to an operation where a perforating gun is lowered by wireline into the casing of a well with a plug attached. The plug is set to isolate between different zones of the formation to direct fluid through the new perforations and into unfractured sections of the shale. Typically, an electrical current is sent down the well via a wireline that attaches to the perforating gun. An electrical charge is used to detonate shaped charges in the gun that form metal jets which perforate through the casing and cement. The perforating gun is then pulled out of the wellbore.

In many wells, the fracking operation is carried out in stages. Typically, a first stage of the well will be perforated and hydraulically fractured. As desired, a plug can be placed at the end of the first stage, and a second stage can then be perforated and hydraulically fractured. With advancements in technology, such multi-stage fracking has become the norm. Fracturing in stages can be completed multiple times to cover the horizontal distance of the wellbore.

Usually in fracturing systems, the fracturing equipment runs on diesel generated power. However, diesel is more expensive, is less environmentally friendly, less safe, and heavier to transport than natural gas. The large amounts of diesel fuel needed to power traditional fracturing operations require constant transportation and delivery by diesel tankers onto the well site. This results in significant carbon dioxide emissions. Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems.

In many known fracking systems, as noted above, the power to run the components in a fracturing system is provided by diesel or other internal combustion engines. Such engines can be very powerful, but have certain disadvantages. For example, diesel engines are very heavy, and so require the use of a large amount of heavy equipment, including trailers and trucks, to transport the engines to and from a wellsite. In addition, such engines are not clean, but generate large amounts of exhaust and pollutants, which can cause environmental hazards, among other problems. Onsite refueling, especially during operations, presents increased risks of fuel leaks, fires, and other accidents.

SUMMARY OF THE INVENTION

Various illustrative embodiments of a system and method for providing electricity to a hydraulic fracturing operation are provided herein. In accordance with an aspect of the disclosed subject matter, the method and system of the present invention provide an auxiliary trailer powered by natural gas run turbines for powering electric wireline equipment to be used in hydraulic fracturing operations. The wireline equipment can include an electric wireline unit, crane truck, and workshop trailer. Further, all of the equipment relating to fracturing operations can be powered by the electricity generated and controlled by the present system including third party equipment.

Embodiments of systems and methods of the present disclosure are designed to provide power to an hydraulic fracturing operation through the use of natural gas powered turbines and an auxiliary trailer. In one embodiment at least one turbine generator driven by natural gas provides the main source of electric power. A second auxiliary trailer with multiple turbines can be provided to supply additional power to the fracturing equipment. Multiple turbines can power a single auxiliary trailer, or a single turbine can power multiple auxiliary trailers depending on the total power demand and the output of the turbine generators. The trailers can include transformers to step the electricity generated by the turbines down to the needed voltage for the hydraulic fracturing equipment. It is also possible to have the transformers physically separate from the auxiliary trailer and electrically connected with cables. They also include a power distribution panel to supply power out to the wireline unit, crane truck, and workshop trailer. There are also newly designed receptacles so that the wireline equipment can be connected quickly and efficiently and new cables, which are able to detach at both ends for fast move in rig up and fast disassembly and take down.

Embodiments of systems and methods of the present disclosure include an auxiliary trailer that also can plug into the existing power grid to power the fracturing equipment. This embodiment will include a special cable that will plug into the trailer and branch the three phases into three power plugs that are color coded and can be between 550V-600V at around 500 amperes to supply wireline equipment. An example of a plug used in this embodiment is a RigPower plug (4140 World Houston Pkwy., Ste. 130, Houston Texas, 77032, www.rigpower.com) but other similar plugs can also be used.

Embodiments of systems and methods of the present invention also include any connection required on the transformer or power junction box so that third party equipment can plug into and receive power from the trailer. Third party equipment can include wireline, water transfer pumps, workover rigs, coil tubing, office trailers, housing trailers, heaters, light plants, production equipment, communication equipment, and safety equipment.

Embodiments of the invention include two separate sets of turbines, each set having two turbines and each set being connected to a separate switch gear, which in turn is connected to a set of transformers. The transformers step down the power from the turbines and switchgears to power a set of pump trailers. The switch gears are also attached to auxiliary trailers which power fracturing equipment such as sand equipment, a hydration unit, one or more blenders, a crane, a wireline tool trailer and a wireline truck. Power is provided from the turbines, to the switchgear, then to the auxiliary trailer unit.

Embodiments of the invention can also include auxiliary trailer units with the transformers in the rear of the unit and the connection panel up from near the gooseneck of the trailer. Further, the switchgear trailer can have connections for incoming power from the turbines and outgoing power to the auxiliary unit. On the other side of the trailer from these connections are connections for outgoing power to more transformers for the fracturing pumps.

Embodiments of the invention include switchgears, which are built to be weatherproof, and able to withstand the wear and tear of mobilization. The switchgears include shock absorbers, placed near the mounting bolts holding the switchgear housing to the trailer frame and near the bolts holding the externally mounted control panels in place. The invention includes two air conditioning units that are installed within the switchgear units to monitor the temperature and to make sure the internal electronics stay within their operating parameters and do not overheat. Embodiments can include two units or a single unit. The trailer has standard air brakes and a front landing gear to ensure the switchgear will not roll or shift its base.

Embodiments of the invention can also include external decks/walkways that have hand rails in place for meeting the Occupational Health and Safety Association's standards. The whole switchgear is constructed according to the standards of the National Environmental Management Act, American National Standards Institute, and the National Fire Protection Association. It includes vacuum circuit breakers, which are installed in draw-out enclosures, which allow them to be removed and replaced in a timely manner. The switchgear is also designed in accord with the Institute of Electrical and Electronics Engineers standards C37.04, C37.06, and C37.20.2 with the following ratings: Maximum Voltage (rms): 13.8 kV, ANSI Rating Basis: MVA Rated, Operating Voltage: 13.8 kV, Short Circuit Current Rating: 25 KA, Close Voltage: 125 VDC, Trip Voltage: 125 VDC.

Further embodiments include that the switchgear is insulated with fire resistant material and that the doors on the trailer can be locked from the outside. The inside of the switchgear is illuminated with standard 120V LED lights and also includes an emergency light if the trailer loses power. The switchgear can receive an emergency off signal that is hardwired from the datavan that shuts down the compressors and any running equipment, and also will disconnect the circuit breakers in the trailer.

The Auxiliary Trailer unit contains a Variable Frequency Drive house which is also known as the Power Control Room, and a transformer mounted onto a single trailer. This can be used to control the blender discharge motor, the blender hydraulic motor, the hydration unit hydraulic motor, blower motors, fan motors, heaters, and other onboard electronics on either the blender or hydration units. The discharge motor on the blender can be speed controlled, and the other motors are run on or off at single speed. The VFD can also contain the soft starter for the smaller blower motors for cooling.

Embodiments of the invention include a transformer unit that is visible on the rear and sits above the triple axels. The transformer is used to convert 13.8 kV to 600 V to provide power to the VFD house. Embodiments of the invention include auxiliary trailers with a 3000 kVA transformer and another embodiment can include a 3500 kVa transformer.

Further, the auxiliary trailer can provide power to the primary and secondary blenders, the hydration unit, the sand conveyor belt, which can be a dual belt, and the datavan. The fleet can contain either one single Auxiliary trailer unit or two, where the secondary blender can be powered at all times by the second auxiliary trailer unit.

Embodiments of the invention can also include a secondary trailer unit that will help with the power cable management. This creates two separate power grids and increases the redundancy of the operation. Two turbines in this embodiment will power a single switchgear which will provide power to half of the fracturing pumps, and a single auxiliary trailer, and if one pair of turbines shuts down due to a mechanical failure, electrical fault, or overheating, the second pair of turbines will allow all the sand laden fluid to be flushed before it settles in the pipes. The primary and secondary blenders are powered by separate auxiliary trailers to allow for a quick blender swap and to minimize downtime.

In another embodiment, the auxiliary trailer units can include connections for the wireline equipment. The sand equipment can also contain connections so that the plug points can be the same for sand and wireline equipment. Each auxiliary unit in this embodiment will have identical connections and one will be used to power the wireline equipment, while the other will be used to power the sand equipment. Another embodiment can have separate types of plugs for sand and wireline equipment respectively. Another embodiment includes plugs for sand equipment on one auxiliary trailer and different plugs for wireline on that trailer, but no sand equipment plugs on the second auxiliary trailer.

Other aspects and features of the present invention will become apparent to those of ordinary skill in the art after reading the detailed description herein and the accompanying figures.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Figure 1:
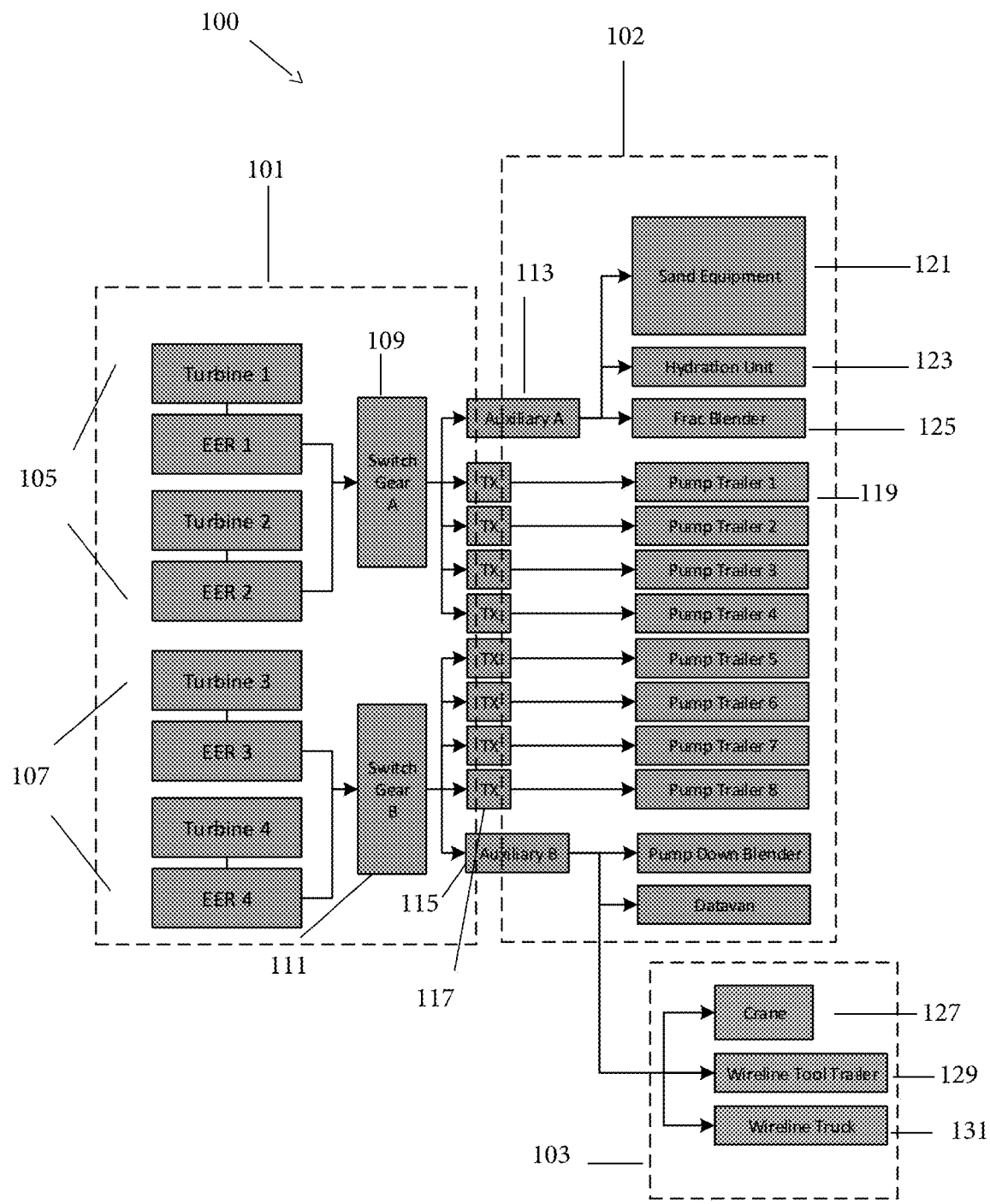
FIG. 1 is a block diagram of an embodiment of the present invention.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

The present invention generally relates to an hydraulic fracturing system and method that is powered by electricity. The system and method are designed to deliver fracturing fluid to a well site. Traditionally, hydraulic fracturing is accomplished when a slurry of fluids and solids is injected into a reservoir to create fractures in the rock formation. Chemicals and fluids are mixed with proppants such as sand and ceramic beads and then pumped into the wellbore at high pressure with hydraulic pumps. The solids remain in the fractures that are created helping to keep them open, while some of the fluids return back out of the well.

One solution to the problems presented by the use of diesel and other engines in fracking operations is to power the equipment associated with the fracking operation using electric motors. Electric motors have the advantage of weighing less than diesel engines, so that they are easier to transport to and from a fracking well site. In fact, in some instances electric motor and pump combinations can be transported to a well site two to a trailer, cutting in half the number of heavy trailers required to be moved to a well site.

In order to fully exploit the advantages provided by powering hydraulic fracking equipment using electric motors, the present invention includes systems and methods for powering numerous other components of a hydraulic fracturing operation using natural gas. The system includes electric wireline units, crane trucks, and workshop trailers, with the goal of reducing or eliminating reliance on diesel motors. The invention also includes a self-contained closed circuit power grid for providing clean and quiet electricity to all equipment on site.

Certain embodiments of the present invention include a set of natural gas powered turbines that produces electricity to power electric motors and pumps used in hydraulic fracturing operations for providing pressurized fracturing fluid. In an example, the invention can include the following features: turbine engine generators fueled by natural gas to supply electricity to electric motors that power hydraulic fracturing pumps in a hydraulic fracturing operation; transformers to step the electricity to the needed voltage of the motors; a power distribution panel to supply power out to other fracturing equipment such as the wireline unit, crane truck, workshop trailer, and other components of the system; new receptacles so that the wireline equipment can be connected quickly and efficiently; and cables that are detachable at both ends for fast move in rig up as well as fast rig down and move out. Further electric motors and pumps are lighter and therefore it is desirable to have a fracturing system that runs on electricity that is taken from an existing power grid or generated from turbines that run on natural gas.

FIG. 1 shows in schematic form an example of a fracturing system 100 at a well site with a power generation system 101, fracturing equipment 102, and wireline equipment 103. In this example, the power generation system 101 contains 10 total trailers with two natural gas powered turbine sets 105 and 107 that have two turbines apiece, but can have more, and each turbine is accompanied by an Electronic Equipment and Control Room (EER). In the illustrated example, the turbine sets 105 and 107 provide electrical power to switch gears 109 and 111, which in turn monitor and control electrical power provided to transformers 117. A single turbine set consists of a trailer containing the natural gas turbine and electric power generator combined with the Electronic Equipment and Control Room. The turbine sets 105 and 107 are supplied with natural gas on site and as their turbines spin they generate electric power. Examples of output of electricity range in potential from around 4180 V to around 15 kV. Any well known, natural gas powered turbine suitable to provide this amount or another similar potential of electricity is included in this disclosure. The two turbine sets 105 and 107 are electrically independent and run in tandem so that in case one loses power due to an overload, the other will not shut down leading to sand slurry hardening down-hole. In the embodiment shown in FIG. 1, there are ten total trailers, two turbine sets 105 and 107 taking up eight trailers and two trailers for the switchgears 109 and 111, but this configuration can be modified depending on the application.

The transformers 117 step down the voltage from 13.8 kV to 600 V and provide it to the pump trailers 119. The pump trailers 119 include electric motors (not shown), which in one example operate at 600 V each. The auxiliary trailers 113 and 115 can take the electricity at 13.8 kV from the switchgears 109 and 111 and provide 600 V to sand equipment 121, hydration unit 123, blender 125, crane 127, wireline tool trailer 129 and wireline truck 131. The auxiliary trailers 113 and 115 also include transformers for stepping down the voltage. Thus in an example, the fracturing system 100 provides electricity to wireline equipment 103 that can be used to conduct wireline operations in a wellbore, examples of which are provided in more detail below. It should be pointed out however, that the supply of electricity from the system 100 is not limited to wireline equipment 103, but can include any third party consumer of electricity.

A further embodiment of the present invention includes a novel design for the switchgears 109 and 111. Switchgears in an electrical system typically include a combination of electrical disconnect switches, fuses or circuit breakers used to control, protect, and isolate electrical equipment. They can be used to de-energize equipment to allow work to be done and to clear faults downstream. By way of background, oil and gas equipment is often transported across rough terrain and left in harsh weather conditions for the majority of its service life. Thus, the switchgear of the present technology is weatherproof and able to endure the wear and tear of mobilization. Shock absorbers can be placed in multiple locations, from the mounting bolts holding the switchgear housing to the trailer frame to the bolts holding externally mounted control panels in place.

According to some embodiments, air conditioning units can be installed within the switchgear to make sure the temperature of the internal electronics stay within their operating parameters and do not overheat. In one example embodiment, two air conditioners are used, but more or fewer can be included. In another embodiment, two air conditioners are installed, but only one is required to meet the cooling demands. This allows for redundancy in the event that an air conditioning unit fails.

In addition, external decks/walkways have handrails in place for safety which meet government safety standards, and the entire switchgear can be designed and built in accordance with government and industry standard regulations, such as NEMA, ANSI, and NFPA regulations.

The switchgears 109 and 111 can include safe and environmentally conscious vacuum circuit breakers. These breakers can be installed in draw-out enclosures which allow them to be removed and replaced in a timely manner and without dismantling the switchgear. The switchgear and breakers are designed in accordance with government and industry standards, including ANSI and IEEE standards C37.04, C37.06, and C37.20.2, and can have the following ratings: Maximum Voltage (rms): 13.8 kV, ANSI Rating Basis: MVA Rated, Operating Voltage: 13.8 kV, Short Circuit Current Rating: 25 KA, Close Voltage: 125 VDC, Trip Voltage: 125 VDC.

The ceiling and walls of the trailer housing for the switchgears 109 and 111 can be insulated with fire resistant material. This helps to prevent an ongoing fire in the case of an accidental arc flash or electric component failure. Furthermore, doors leading to the inside of the switchgear housing can be locked from the outside; thereby preventing access from any unauthorized and untrained workers. The doors, however, can still be opened from the inside, in order to prevent personnel from being accidentally locked inside. In addition, all external power cable plug-ins are clearly labeled and marked so personnel can see where a particular cable is connected without confusion. This will also prevent cables from being run to the wrong pieces of equipment.

According to some embodiments, the inside of the switchgear housing can be illuminated with standard 120 V LED lights to provide a well-illuminated internal working environment. If there is a loss of power on the switchgear trailer, a battery operated emergency light can be automatically activated. This will make sure that workers will always have a source of light for a safe working environment.

In addition, switchgears 109 and 111 can have the capability to receive an Emergency Power Off signal from a datavan. This signal is designed to shut down the compressors and any running equipment as well as disconnect the breakers in the switchgears. It is a hardwired connection that provides a failsafe in the event of an emergency. Also, the trailer can be equipped with standard air brakes and front landing gear to insure a stable base that will not shift or roll once the switchgear is in position and deployed at a well site.

Also included in certain embodiments of the present technology is a novel auxiliary trailer to provide power to the electric wireline equipment. In addition, a second auxiliary trailer can be included to provide additional power connections. In some embodiments, the auxiliary trailer can provide up to about 300 kVA or more of three phase electrical power using the same or a similar plug-in to other known sand equipment. A single cable can have three separate plugs, one for each phase, to connect to the auxiliary trailer. The attachment point on the sand equipment is a single plug containing three conductors on the auxiliary ends of a cable. The cable in one instance can be 240 feet long that uses single conductor plugs on the auxiliary end. The sand equipment can use a single large 3 conductor connection. Further, the sand equipment and the wireline equipment cable can be identical, but the wireline equipment can use a different plug such as three single conductor plugs to plug into the auxiliary trailer plug-in.

The auxiliary trailer can contain a 3500 kVA transformer which steps the 13.8 kV power from the turbines down to 600 V for use by the equipment. The turbines can be fueled by natural gas, thereby decreasing costs associated with fuel consumption, as well as emissions. During a wireline run (pump down), there are several megawatts of power available for use, and the wireline equipment may typically require only from about 250 kVA to about 300 kVA of that power.

In some embodiments of the invention, and in order to provide three-phase 550 V-600 V power at around 500 amperes, a diesel locomotive cable with internal conductors composed of stranded wire capable of sustaining this power draw while being able to plug into the auxiliary trailers 113 and 115 can be used. One end of the cable is compatible with the fracking equipment used at a particular well site, with a cable branch having three phases for connection into three power plugs, each color coded to its receptacle. The opposite end of the cable can be adapted to engage an available transformer or power junction box at or near the well site.

In yet another embodiment, an auxiliary unit is included that contains a variable frequency drive (VFD) housing (also referred to as a Power Control Room) and a transformer mounted onto a single trailer. It can be used to power and control equipment such as the blender discharge motor (1750 HP VFD drive), blender hydraulic motor (600 HP soft starter), and the hydration unit hydraulic motor (600 HP soft starter). Typically, the discharge motor on the blender can be speed controlled, the other two large motors be run on or off at a single speed. The VFD housing can also contain the soft starter for the smaller blower motors for cooling.

Power can be provided from the turbine generators of the turbine sets 105 and 107, to the switchgears 109 and 111, then to the auxiliary trailers 113 and 115. The transformer portion of the unit can be on the rear of the trailers sitting above the triple axles but can be unattached in some embodiments. The transformer portion can be used to convert power from 13.8 kV to 600 V to provide power to the VFD housing. The auxiliary unit VFD housing is similar to the VFD housing used on the fracking pumps.

The auxiliary unit can be used to provide power to the primary and secondary blenders, the hydration unit, the sand conveyor belt (Dual Belt), and the datavan. The addition of a second auxiliary trailer can help with power cable management by providing alternative cable routing options instead of trying to plug in all of the equipment spread out across location to a single auxiliary trailer. Having a second auxiliary also allows the use of two separate power grids, thereby increasing the redundancy of operations.

Two turbines can power a single switchgear, which in one example provides power to half of the fracking pumps, and a single auxiliary trailer. If one pair of turbines shuts down due to a mechanical failure, electrical fault, or overheating, the second pair of turbines allows flushing of the well, where all of the sand laden fluid still in the wellbore is displaced into the formation before it settles in the pipe to prevent a "screen out". The primary and secondary blenders can be powered by separate auxiliary trailers to allow for a quick blender swap to minimize downtime.

The auxiliary units can be modified to include connections for the wireline equipment. In addition, the sand equipment connections can be upgraded to allow use of the same plug points for sand as well as wireline. This way the two auxiliary units can be configured identically, with one powering sand equipment and the other powering wireline equipment. According to an alternate embodiment, plugs can be provided for sand and wireline equipment cables on all of the auxiliary units. According to yet another embodiment, plugs can be provided for sand equipment cables on one auxiliary trailer and different plugs for wireline equipment cables but not sand equipment cables on a second auxiliary trailer.

Figures 2, 3:
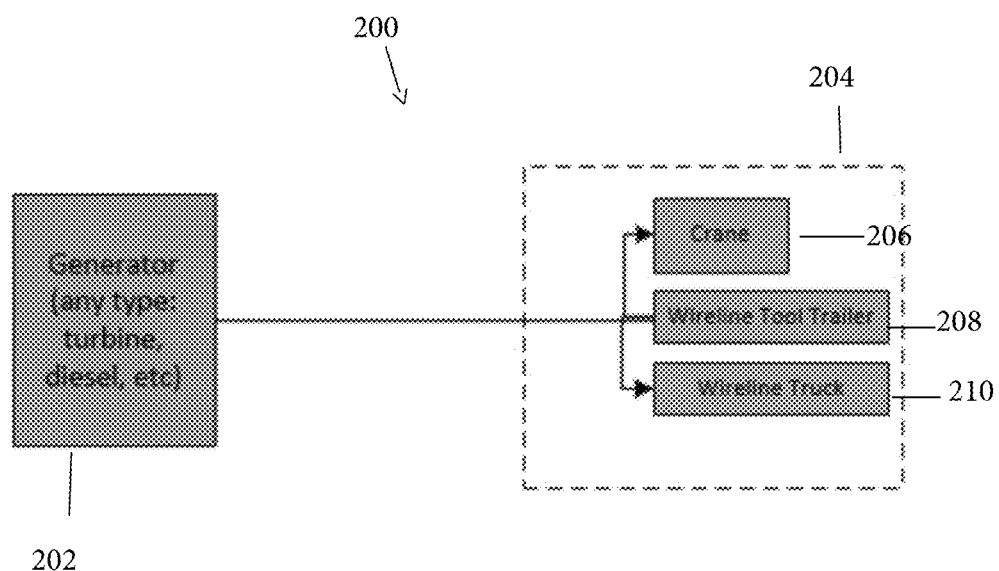
FIG. 2 is a block diagram of a second embodiment of the present invention.
FIG. 3 is a block diagram of a third embodiment of the present invention.

FIG. 2, where a second embodiment of the system is schematically illustrated, shows a power generation system 200 with any type of generic electricity generator 202 powered by natural gas, diesel, or other hydrocarbon fuel sources, and having an electrical output connected to the wireline equipment 204, which includes a crane 206, wireline tool trailer 208, and wireline truck 210. In this example, the voltage is the same from the generator 200 to the fracturing equipment 204 at 600 V, and therefore a transformer is not needed to step down the power.

Schematically depicted in FIG. 3 is a third embodiment of the invention which shows a power generation system 300 with a transformer 306 that either steps up the voltage from the generator 302 to the wireline equipment 304, or steps down the voltage from generator 302 to the wireline equipment 304. In this example the wireline equipment 304 includes the crane 308, the wireline tool trailer 310, and the wireline truck 312, which are powered at 600 V.

Figure 4:
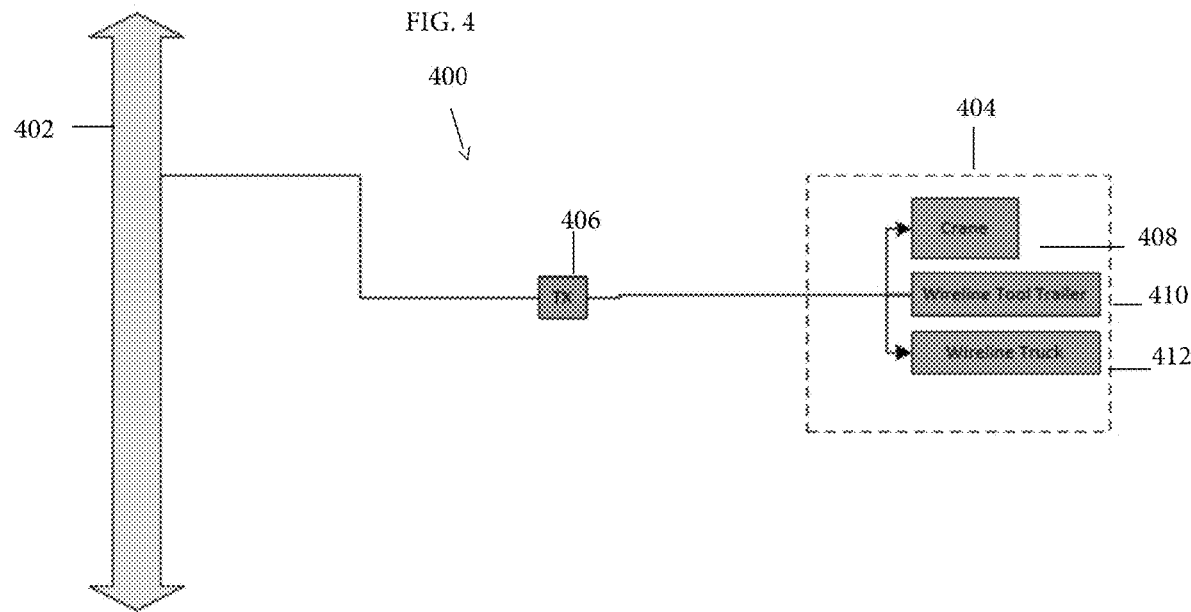
FIG. 4 is a block diagram of a fourth embodiment of the present invention.

FIG. 4 is a fourth embodiment of the invention and shows that the power can be pulled in the generation system 400 from a utility line 402 or generator which requires a higher voltage to minimize transmission loss. The system 400 of FIG. 4 also uses a transformer 406 to step down the voltage for the fracturing equipment 404, which includes a crane 408, a wireline tool trailer 410 and a wireline truck 412.

Figure 5:
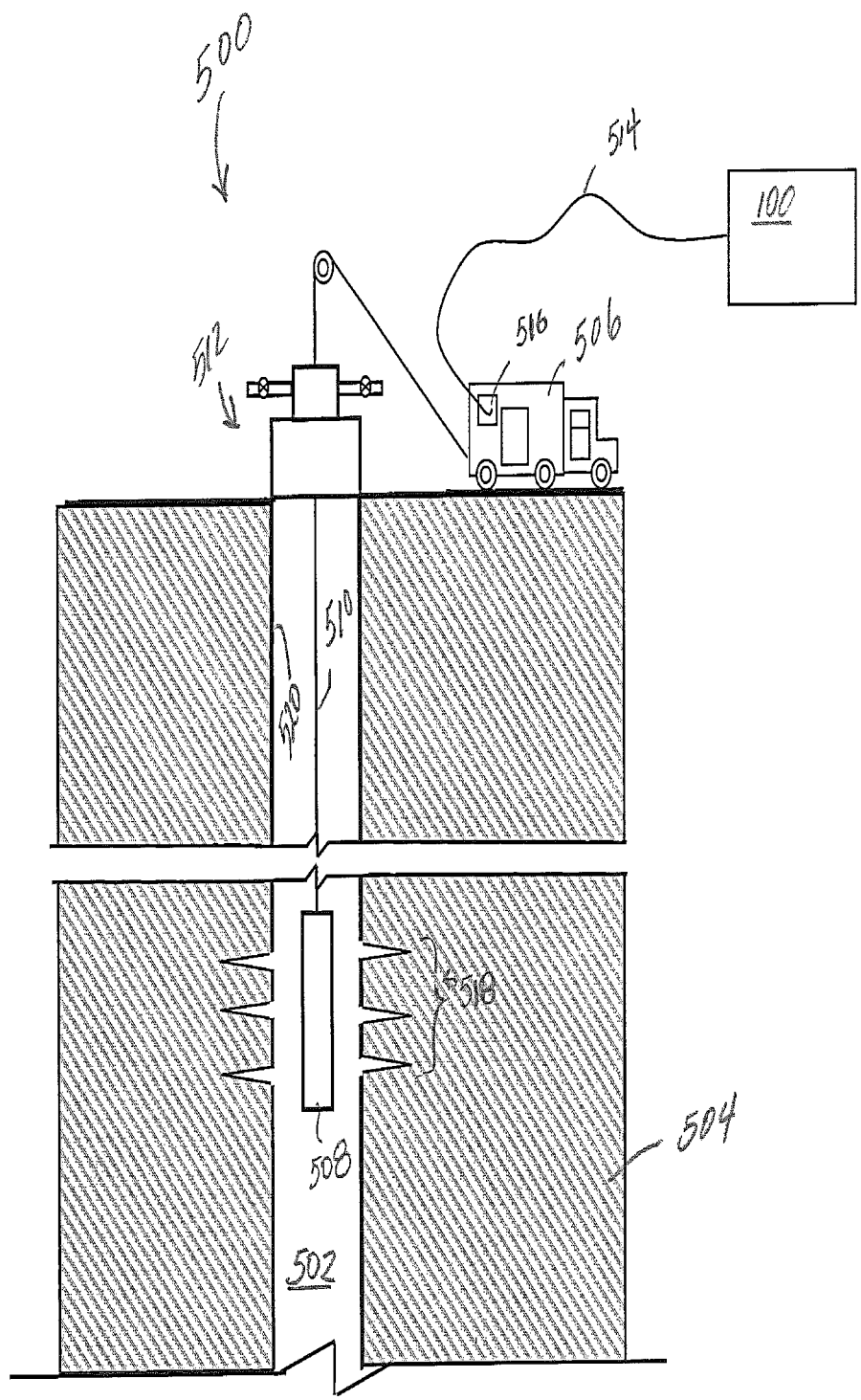
FIG. 5 is a side sectional view of a wellsite.

Referring now to FIG. 5, shown in a side sectional view is an example of a wireline system 500 for use with conducting wireline operations in a wellbore 502, where the wellbore 502 is shown intersecting a subterranean formation 504. The wireline system 500 includes a wireline truck 506 disposed on surface and proximate an opening of the wellbore 502. A wireline tool 508 is shown deployed on an end of a length of wireline 510 and disposed in the wellbore 502. Examples of the wireline (or downhole) tool 508 include a perforating gun, a plug, a formation logging tool, a cutting tool, a tubular inspection tool, strings of these tools, and combinations thereof. In the example of FIG. 5, a wellhead assembly 512 is optionally mounted at the opening of the wellbore 502, and through which the wireline 510 is inserted into the wellbore 502. The wireline system 500 is illustrated being in electrical communication with fracturing system 100 via power line 514. The power line 514 is illustrated connecting to an electrical panel 516 mounted on the wireline truck 506. Accordingly, electricity generated in the fracturing system 100, in addition to powering fracturing operations in a different wellbore, is directed to the wireline system 500 and used for energizing components of the wireline system 500. Examples of the components being energized include a winch or reel for raising and lowering the wireline 510, electronics in the wireline truck 506, and the wireline tool 508.

In one example where the wireline tool 508 is a perforating gun or string, delivering electricity to the perforating gun via the wireline 510 can initiate detonation of shaped charges (not shown) in the wireline tool 508. Detonating the shaped charges in turn creates metal jets that create perforations 518 extending through casing 520 that lines the wellbore 502 and into the surrounding formation 504. In an alternate embodiment, the wireline tool 508 can be deployed on coiled tubing (not shown), and where electrical and signal communication between the wireline tool 508 and surface can be via the wireline 510, or another communication means disposed in or with the coiled tubing that transfers signals and/or electricity. Examples of another communication means include conductive materials, such as metal or conductive composites, fiber optics, or wireless.

One significant advantage provided by the present invention is that it will allow the use of clean and quiet electric equipment for wireline to be used, further eliminating the need for diesel fuel. It will be a step towards creating a more environmentally conscious fracturing operation.

The power generation equipment can be trailer mounted, skid mounted, truck mounted, or permanently fixed depending upon the application. The transformer can be part of the auxiliary unit or separate stand-alone so that it can provide a bigger step down in electricity. Electricity can also be generated at a single voltage to be used in the equipment, eliminating the need for a transformer. The transformer can be used to provide any voltage required to power any wireline equipment; and using the system of the present invention, it will be possible to provide power to any third party company on a well site.

Various modifications can be made to the wireline power supply during electric fracturing operations system and method set forth in this Specification and these embodiments described are not intended to limit the scope of the invention.

What is claimed is:
1. A fracturing system comprising:
    a power source having an electrical output;
    an electric motor in electrical communication with the electrical output;
    a variable frequency drive (VFD) connected to the electric motor;
    a fracturing pump that is driven by the electric motor;
    at least one switchgear in electrical communication with the electrical output; and
    a wireline system in electrical communication with the electrical output via the at least one switchgear, wherein the electrical output provided to the wireline system is adjusted via one or more transformers positioned between the at least one switchgear and the wireline system, wherein the wireline system comprises a wireline tool that is disposable in a wellbore that is selected from the group consisting of a perforating gun, a plug, a formation logging tool, a cutting tool, a casing imaging tool, and combinations thereof.
2. The fracturing system of claim 1, wherein the at least one switchgear is positioned on a trailer and includes a housing.
3. The fracturing system of claim 1, wherein the at least one switchgear is configured to disconnect one or more electrical connections responsive to a signal received from a datavan.

4. The fracturing system of claim 1, further comprising: one or more distribution panels configured to couple the electrical output to the wireline system.

5. The fracturing system of claim 1, further comprising: one or more fracturing transformers associated with the fracturing pump, wherein the one or more fracturing transformers step at least one of around 13.8 kV power or around 4180 V power from the power source down.

6. The fracturing system of claim 1, further comprising: a blender; and
a second VFD connected to a blender discharge motor, wherein the blender discharge motor is speed controlled.

7. The fracturing system of claim 1, wherein the one or more transformers are separate from different transformers associated with the fracturing pump.

8. The fracturing system of claim 1, wherein the one or more transformers are configured to create a power grid separate from a fracturing power grid configured to power the electric motor.

9. The fracturing system of claim 1, wherein the one or more transformers comprise at least one emergency shut-off switch.

10. The fracturing system of claim 1, further comprising: a pump trailer supporting the electric motor, the fracturing pump, and the VFD.

11. A system, comprising:
a power source having an electrical output;
a pump trailer including at least an electric motor in electrical communication with the electrical output, a fracturing pump driven by the electric motor, and a variable frequency drive (VFD) connected to the electric motor;
at least one switchgear connected to the power source; and
a wireline system that is in electrical communication with the electrical output via the at least one switchgear, wherein the wireline system is selected from the group consisting of a perforating system, a plugging system, a formation logging system, a tubular cutting system, a tubular imaging system, and combinations thereof.

12. The system of claim 11, further comprising:
a transformer positioned between the wireline system and the at least one switchgear to adjust an output voltage of the power source for use by the wireline system.

13. The system of claim 12, wherein the transformer includes a 3000 KVA transformer that steps down power from the power source.

14. The system of claim 12, further comprising:
a pump down blender; and
a datavan;
wherein each of the pump down blender and the datavan are in electrical communication with the transformer.

15. The system of claim 11, wherein the power source includes at least one of a generator or a utility line.

16. The system of claim 11, further comprising:
fracturing support equipment including at least one of sand equipment, a hydration unit, and a blender.

17. The system of claim 11, wherein a first transformer is associated with the wireline system and a second transformer is associated with the pump trailer.

18. The system of claim 11, wherein the at least one switchgear is configured to disconnect one or more electrical connections responsive to a signal received from a datavan.

* * * * *